Patented May 23, 1950

2,508,663

UNITED STATES PATENT OFFICE 2,508,663

PROCESS FOR THE MANUFACTURE OF CREAM CHEESE

Roland Pierre Chénier, Villemomble, France

No Drawing. Application May 31, 1947,
Serial No. 751,641

1 Claim. (Cl. 99—116)

The present invention relates to a triple cream fresh cheese wherein the butter fat constitutes 75% of the total.

Processes are known for the manufacture of enriched fresh cheese by the addition of cream (double cream with about 66% of butter fat and triple cream with 75%) which make use of a mixture of cream and curds sufficiently drained to obtain a conveniently mouldable product after homogenization (i. e. of square or cylindrical shape such as that known as "Petit Suisse," made in France). Other processes are used for the production of "light" paste cheeses such as those known in France under the name of "Fontainebleau" and are characterised in that the cream is emulsified with air before its incorporation in the curds. In a variation of these processes the curds are well drained to limit the speed of acidification of the finished product. Again, mention must be made of the known processes for the manufacture of whipped creams for pastry purposes in which some of the cream with the addition of a colloidal hydrosol is whipped in the presence of air to give a more or less stable emulsion.

The process according to the present invention requires the following main materials:

1. Rich cream, with a minimum of 500 grams of butter fat per liter, pasteurized, preferably by infra-red rays;
2. Milk, completely pasteurized, preferably by infra-red rays, and then cooled;
3. Fresh curds obtained by using rennet and milk which has been freshly pasteurized preferably by means of infra-red rays in known manner, said curds being cooled, drained in known manner (either in a muslin bag or in a commercial curd press) washed with water to completely eliminate the lacto-serum which can eventually cause acidification and therefore poorer preservation of the product, and finally drained again by any known process to bring the mixture to at least 50% humidity.
4. A colloidal hydrosol of gum tragacanth or other mucilage, gelose, pectin, etc., according to te following process.

The cream is brought to a richness of about 500 grams of butter fat per liter, pasteurized preferably by infra-red rays and then submitted to a natural aging or ripening at about 5° C. for three or four days. The whole milk that is say fresh milk before the removal of the cream commonly known as "whole milk," is pasteurized by the infra-red rays at the time of use and is then cooled. The fresh curds of creamed milk, that is to say curds obtained as described in paragraph 3 above, from milk pasteurized preferably by infra-red rays, is obtained by curdling with weak doses of rennet while taking all the normal precautions against contamination by any undesirable organisms, then broken up, washed with water to eliminate the lacto-serum mixed with the whole of the milk previously described, and finally homogenized by the known and normal methods. The colloidal hydrosol of gum tragacanth, or other mucilage, gelose or pectin, etc., is prepared hot or cold, and used, in all cases cold.

The products, prepared as indicated above, are mixed at the rate of 3000 grams of cream for 1500 grams of whole milk, and 600 grams of curds for 50% of dry extract.

The mixture is passed into a beater, or better, an aero-beater, which is a device providing for simultaneous beating and blowing in of air, until it is at the desired consistency.

Before the beating is completed the colloidal solution is added to stabilise the air-emulsion in the mixture.

The following table gives the approximate amounts for its composition in dry extract:

| | Butter Fat | Dry Extract Other Than Butter Fat | Dry Extract Total |
|---|---|---|---|
| 3,000 grams cream | 1,500 | 90 | 1,590 |
| 1,500 grams whole milk | 60 | 130 | 190 |
| 600 grams fresh curds | | 300 | 300 |
| 5,100 grams triple cream cheese | 1,560 | 520 | 2,080 |

It should be understood that the proportions given above are given as an indication and can vary, taking into account the different initial compositions of the main materials used.

I claim:

Method of making a high milk fat content cream cheese of about 75% fat content by the steps of pasteurizing creamy milk with infra-red rays, cooling the creamy milk, pasteurizing cream with infra-red rays, aging the cream at about 5° C. for about three days, pasteurizing fresh milk with infra-red rays, treating the fresh milk with rennet to form a curd, breaking up the curd, washing the curd with water, draining the curd, mixing the milk, aged cream of high fat content and curd, beating the mixture and adding a binder selected from the group consisting of the colloidal hydrosols of gum tragacanth, gelose and pectin to stabilize the air emulsion in the mixture.

ROLAND PIERRE CHÉNIER.

REFERENCES CITED

The following references are of record in the file of this patent:

UNITED STATES PATENTS

| Number | Name | Date |
|---|---|---|
| 2,160,159 | Lindstedt | May 30, 1939 |
| 2,224,720 | Butterworth et al. | Dec. 10, 1940 |
| 2,387,276 | Link | Oct. 23, 1945 |